No. 713,986. Patented Nov. 18, 1902.
J. H. HUDGSON.
METHOD OF INDICATING SPEED.
(Application filed Feb. 10, 1902.)
(No Model.)
2 Sheets—Sheet 1.
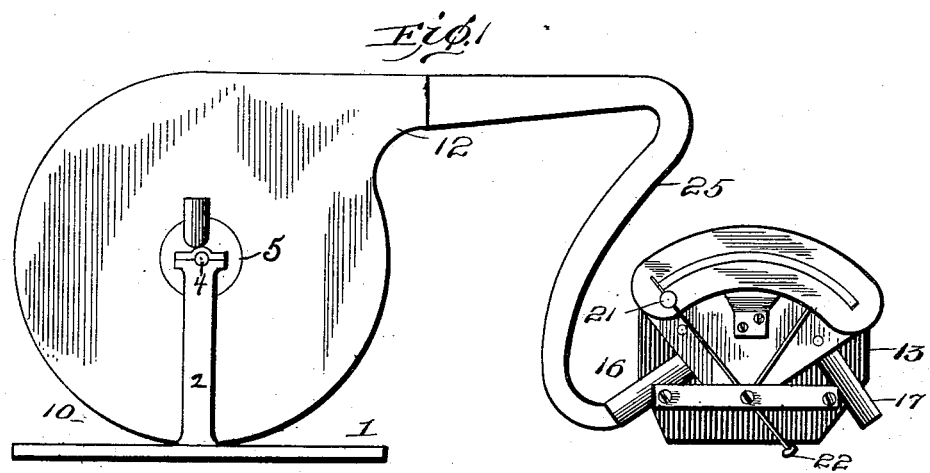
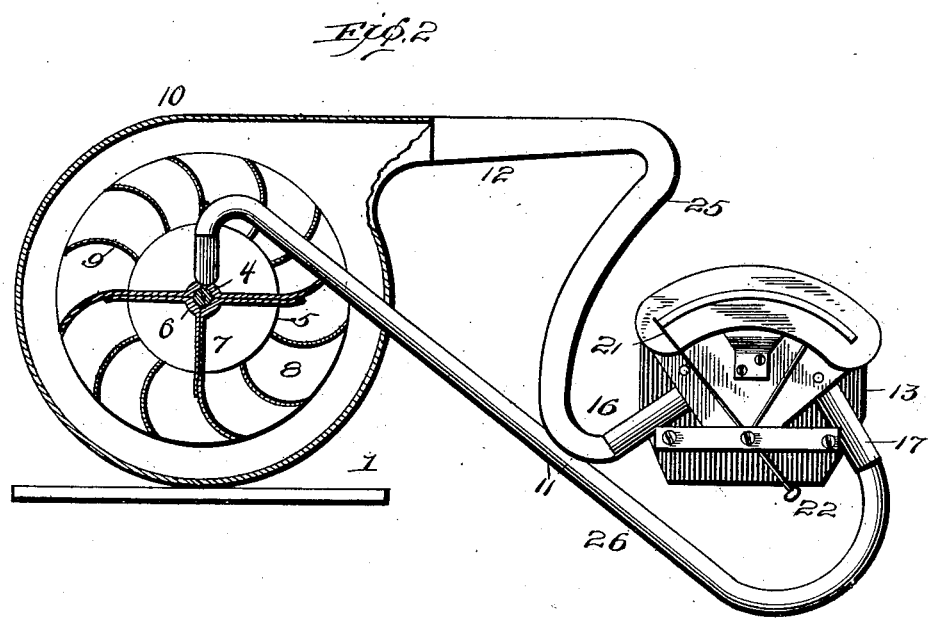

No. 713,986. Patented Nov. 18, 1902.
J. H. HUDGSON.
METHOD OF INDICATING SPEED.
(Application filed Feb. 10, 1902.)
(No Model.) 2 Sheets—Sheet 2.
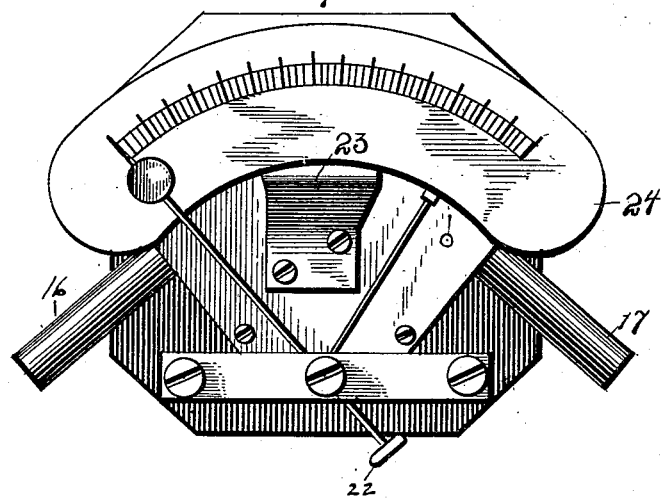
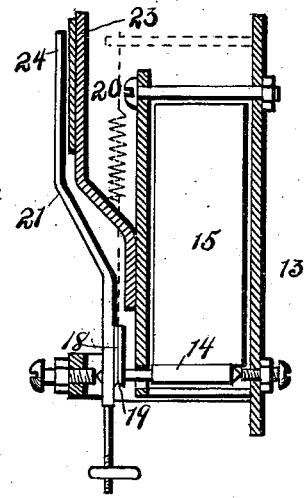
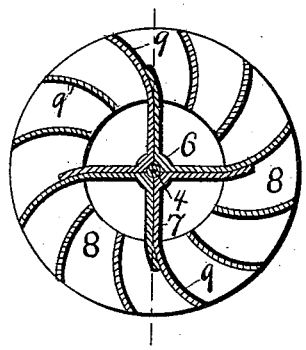
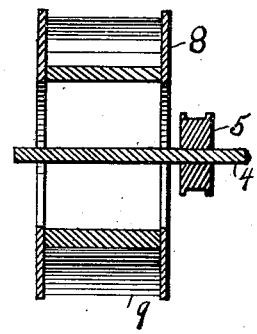
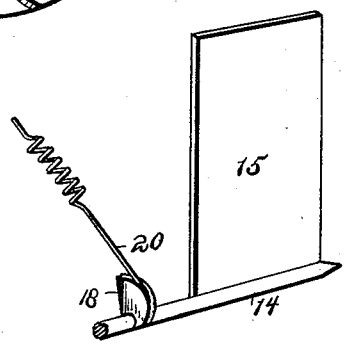

UNITED STATES PATENT OFFICE.

JOHN HOWARD HUDGSON, OF PHILADELPHIA, PENNSYLVANIA.

METHOD OF INDICATING SPEED.

SPECIFICATION forming part of Letters Patent No. 713,986, dated November 18, 1902.

Application filed February 10, 1902. Serial No. 93,355. (No model.)

*To all whom it may concern:*

Be it known that I, JOHN HOWARD HUDGSON, a citizen of the United States of America, residing at Philadelphia, in the county of Philadelphia and State of Pennsylvania, have invented certain new and useful Improvements in Speed-Indicators, of which the following is a specification.

This invention relates to a device for indicating speed by means of air transmitting energy from a fan to a suitable indicating instrument.

The object of my invention is to provide a device for indicating speed, or the revolutions of a shaft, or the angular velocity of a body, such as a fly-wheel revolving upon a center in a given time, or the speed of a body in a linear motion, such as the speed of a street-car, a locomotive, an automobile, &c.
Another object of my invention is to provide a device for indicating speed, whereby the number of revolutions of a moving or revolving body may be measured, whether that body be near to or a considerable distance from the indicating instrument.

With these objects in view and such others as may hereinafter appear as the nature of the invention is better understood I make use of certain novel features, the particular construction of the various parts, and the manner of arrangement and combination of the said parts, all of which will be fully described and illustrated.

In the drawings forming a part of this specification, Figure 1 is a side elevation of a centrifugal fan connected to an indicating instrument by a single tube. Fig. 2 is a similar view illustrating the fan connected by two tubes, one side of the fan-casing being removed. Fig. 3 is a front elevation of the indicating instrument. Fig. 4 is a vertical sectional view of Fig. 3, illustrating the interior construction of the indicating instrument. Fig. 5 is a detail view of a centrifugal fan mounted upon a shaft. Fig. 6 is a sectional view of the fan, and Fig. 7 is a perspective view of the vane and cam.

Referring by numerals to the drawings, 1 represents the base of the centrifugal fan.
This base may be mounted adjacent to or a considerable distance from a shaft the revolutions of which it is desired to ascertain. Mounted upon the base are two uprights 2, having oppositely-disposed bearings in which is journaled a shaft 4, carrying a pulley 5, connected to the first-mentioned shaft by any suitable gearing, and a fan consisting of a hub 6, having radial spokes 7, carrying oppositely-disposed disks 8, between which is secured a series of blades 9, which may be either curved or straight, (preferably curved to avoid noise at high speed,) the entire fan being inclosed by a casing 10, having secured in one side thereof approximately near the center an inlet-pipe 11 and tangent with the top thereof a discharge-pipe 12, the whole of the casing resembling the form of an arithmetical spiral.

In Fig. 5 I have shown a modified form of the fan, wherein I have simply mounted the fan proper upon a shaft the speed of which it is desired to ascertain, thereby dispensing with the mounting and gearing, as illustrated in Figs. 1 and 2.

The speed-indicating instrument comprises a suitable casing 13, which may be mounted adjacent to or a considerable distance from the fan. Pivotally mounted within the walls of the casing is a spindle 14, carrying a vane 15, which is adapted to move freely therein. The casing is further provided with an inlet-pipe 16, secured in one side, and a discharge-pipe 17, secured in the other, the object of which will be hereinafter explained. Mounted upon the same spindle which carries the vane is a cam 18, having a curved slotted face 19, upon which one end of the spring 20 is wound, the other end being connected to the top of the casing in any desirable manner. This spindle also supports and controls the needle 21, which is provided with an adjustable weight 22, adapted to counterbalance the weight of the vane, cam, and needle. Inclosing a portion of the spring 20 is a casing 23, which serves as a support for a graduated dial 24, over the face of which the needle moves.

The fan and indicating instrument are connected by a tube 25, which leads from the discharge-pipe 12 of the fan to the inlet-pipe 16 of the indicating instrument, as clearly shown in Fig. 1. It may also be connected by a tube 26, leading from the discharge-pipe 17 of the indicating instrument to the inlet-pipe 11, secured in the casing of the fan, as clearly shown in Fig. 2. While the latter connection is by no means essential, it may be found desirable in order to avoid dust from getting into the tubes and the instrument.

It will be clearly seen that when the fan is set in motion energy is transmitted by means of air from the discharge-pipe upon the fan through the tube to the inlet-pipe upon the indicating instrument. When the air is forced into the instrument, it impinges upon the vane, thus moving the needle, as the needle and vane are mounted upon the same spindle.

Taking the well-known formula, V equals eighty times the square root of P, where V equals the velocity of the tips of the fan-blades in feet per second and P equals the pressure of air per ounce per square inch we get P equals 0.0001706 V square. From the first of these two equations it shows that a cam can be formed so that when its angular displacement is retarded by the action of a spring the angular displacement of the vane, and hence the angular displacement of the needle, will be proportional to the velocity of the fan-blades, whereas from the last of the two equations it is seen that without the cam and using a spring the angular displacement will be proportional to the pressure of the air, which in turn is proportional to the square of the velocity of the fan-blades. Hence by the use of the cam the scale divisions upon the dial of the instrument can be made almost exactly proportional to the velocity of the body whose speed it is desired to obtain, since the velocity of the tips of the fan is directly proportional to the speed of the moving body.

Since it is really the pressure of the air that is desired, the quantity may be small. Hence the power to drive the fan is small. The friction of the conducting-tubes being almost negligible, it will be readily seen that the instrument can be placed at a great distance from the body whose speed it is desired to determine.

What I claim as my invention, and desire to secure by Letters Patent, is—

1. A speed-indicator, in combination with a fan, said indicator consisting of a casing having oppositely-disposed inlet and exhaust ports, a vane mounted upon a revolving shaft within the casing, a pointer and a cam mounted upon the said shaft on the exterior of the casing, a spring engaging the cam, a dial upon the casing over which the pointer moves, and sealed tube connections between the said fan and inlet and exhaust ports, substantially as specified.

2. In a speed-indicator, the combination of a fan inclosed within a casing, and the indicator comprising a casing having oppositely-disposed inlet and exhaust ports in its respective ends, a transverse shaft mounted in the side walls of the casing, a vane carried by the said shaft within the casing, a pointer and a cam mounted upon the said shaft on the exterior of the casing, the said pointer and cam controlled by the action of the vane and a spiral spring in engagement with the cam, an adjustable weight upon the pointer, a dial over which the pointer moves, and sealed tube connections between the fan and inlet and exhaust ports, substantially as specified.

3. A speed-indicator, in combination with a fan, the indicator comprising a casing having oppositely-disposed inlet and exhaust ports in its respective ends, a pivotal shaft journaled in the side walls of the casing, a vane carried by the said shaft intermediate the inlet and exhaust ports, a pointer and a cam mounted upon the shaft on the exterior of the casing, a spiral spring connecting the cam to a stationary bracket, an adjustable balance-weight upon the said pointer, a dial over which the pointer moves, and sealed tube connections between the fan and inlet and exhaust ports, substantially as specified.

4. In a speed-indicator, the combination of a fan inclosed within a casing, an indicator consisting of a casing having inlet and exhaust ports in its respective ends, the said inlet and exhaust ports being connected to the fan-casing by sealed tube connections, a pivotal shaft journaled in the side walls of the casing, a vane carried by said shaft intermediate the inlet and exhaust ports, a pointer and a cam mounted upon the shaft, a spiral spring engaging the said cam, an adjustable balance-weight upon the pointer, a dial over which the pointer moves, the action of the said pointer being controlled by the said vane, cam and spring, substantially as set forth.

JOHN HOWARD HUDGSON.

Witnesses:
 CHAS. E. BONINE,
 ALLEN LATSHAW.